(12) United States Patent
Scott et al.

(10) Patent No.: US 11,066,253 B2
(45) Date of Patent: Jul. 20, 2021

(54) CONTAINER DUMPING MODULE

(71) Applicant: INTELLIGRATED HEADQUARTERS, LLC, Mason, OH (US)

(72) Inventors: Darius Scott, Baltimore, MD (US); Long Ha, Frederick, MD (US); Carl Gunter, Baltimore, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/519,497

(22) Filed: Jul. 23, 2019

(65) Prior Publication Data

US 2021/0024299 A1  Jan. 28, 2021

(51) Int. Cl.
*B65G 47/96* (2006.01)
*B65G 47/46* (2006.01)
*B65G 47/52* (2006.01)

(52) U.S. Cl.
CPC ............. *B65G 47/96* (2013.01); *B65G 47/46* (2013.01); *B65G 47/52* (2013.01)

(58) Field of Classification Search
None
See application file for complete search history.

(56) References Cited

U.S. PATENT DOCUMENTS

| | | | |
|---|---|---|---|
| 5,558,485 A | 9/1996 | Haynes | |
| 5,788,461 A * | 8/1998 | Easton | B65G 59/08 198/594 |
| 6,182,815 B1 * | 2/2001 | Eggebrecht | B07C 1/04 198/468.1 |
| 6,896,471 B2 * | 5/2005 | Svyatsky | B65H 1/025 198/404 |
| 10,752,454 B2 * | 8/2020 | Burns | B65F 1/1473 |

OTHER PUBLICATIONS

YouTube Video, High Dump Lift and Clamp Drum Dumper, [online], Apr. 4, 2014, [retrieved Jan. 22, 2020], retrieved from the Internet <URL: https://www.youtube.com/watch?v=M4IBOr-3SBs> 6 pages.

* cited by examiner

*Primary Examiner* — Kavel Singh
(74) *Attorney, Agent, or Firm* — Alston & Bird LLP

(57) ABSTRACT

A container dumping module comprises a frame assembly and a conveyor bed with plurality of rollers supported on the frame assembly. A cradle assembly positioned on the frame assembly. The cradle assembly comprises a pair of lower and upper guide support plates to support a container in a home position, a transit position, and a work position. A drive assembly mechanically coupled to the frame assembly and configured to drive the cradle assembly to one of the home position, the transit position, or the work position.

18 Claims, 11 Drawing Sheets

CONTAINER DUMPING MODULE

TECHNOLOGICAL FIELD

The present disclosure relates generally to a container dumping module for handling totes or containers, and, more particularly, to a container dumping module as a part of a conveyor system.

BACKGROUND

Material handling systems can convey, sort, and organize items (e.g. cartons, cases, containers, shipment boxes, totes, packages, and/or the like) at high speeds. Depending on a configuration of the material handling systems, the items may travel through various locations in a warehouse in an unregulated manner, or may be repositioned, reoriented, consolidated, and sorted to a destination location. Material handling systems may comprise a conveyor controller and/or warehouse management system to facilitate organization of items being conveyed and/or handled in the warehouse at the various locations.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein, relates to a container dumping module including a frame assembly and a drive assembly mechanically coupled to the frame assembly. A cradle assembly suspended on the drive assembly, wherein the cradle assembly comprises: one or more finger-like structures provided at a lower end of the cradle assembly to support at least a portion of bottom face of a container in at least one of a home position or work position or transit position. A first support plate and a second support plate positioned at an upper end of the cradle assembly to support at least a portion of a top face of the container in at least one of the home position or work position or transit position. Further, a third support plate positioned perpendicular to the first support plate and the second support plate to support at least a portion of a side face of the container in at least one of the home position or work position or transit position. The one or more finger-like structures, the first support plate, the second support plate, and the third support plate are mechanically coupled to each other with a support bracket.

Various example embodiments described herein, relates to the drive assembly which comprises an idler shaft extending from a first side of the frame assembly to a second side of the frame assembly and the cradle assembly is fastened to opposite ends of the idler shaft.

Various example embodiments described herein, relates to the cradle assembly comprising a front rail positioned perpendicular to the first support plate and the second support plate to support at least a portion of the top face of the container in at least one of the home position or work position or transit position. A back rail positioned opposite to the front rail and parallel to the third support plate to provide additional support to the at least a portion of the side face of the container in at least one of the home position or work position or transit position.

Various example embodiments described herein, relates to the container dumping module including an additional frame assembly is coupled to the frame assembly. The additional frame assembly comprises a chute to guide items into an empty container. A container support structure to hold the empty container.

Various example embodiments described herein, relates to the container dumping module including a guide structure coupled to the support bracket to guide the container into the cradle assembly, wherein the guide structure comprises a protruding portion extending away from the one or more finger-like structures, and wherein the protruding portion comprises an angled cut to guide the container.

Various example embodiments described herein, relates to the frame assembly including a conveyor bed comprising plurality of rollers with the finger-like structures interposed between the plurality of rollers.

Various example embodiments described herein, relates to the frame assembly including one or more sensors to monitor the container at one of the home position, the work position or the transit position.

Various example embodiments described herein, relates to the drive assembly including a drive pulley, a driven pulley, idler pulley, timing belt, and a drive unit.

Various example embodiments described herein, relates to the cradle assembly including a bumper stop made of a rubber or elastomer piece to stop the cradle assembly with a cushioned action in the home position.

Various example embodiments described herein, relates to the frame assembly which comprises an upright post, a cross-member support and a releasable lock.

Various example embodiments described herein, relates to the first support plate, the second support plate, and the third support plate comprises angled portions extending in one of a "XY" plane or "XZ" plane.

Various example embodiments described herein, relates to the support bracket which is positioned perpendicular or substantially right angles to the third support plate, the front rail and the back rail, wherein the support bracket comprises a pair of curved hook members.

Various example embodiments described herein, relates to a container dumping module. The container dumping module includes a frame assembly and a conveyor bed with plurality of rollers supported on the frame assembly. A cradle assembly positioned on the frame assembly. The cradle assembly includes a pair of lower and upper guide support plates to support a container in a home position, a transit position, and a work position. A drive assembly mechanically coupled to the frame assembly and configured to drive the cradle assembly to one of the home position, the transit position, or the work position.

Various example embodiments described herein, relates to the cradle assembly including one or more sensors to monitor the container at one of the home position, the work position or the transit position.

Various example embodiments described herein, relates to the cradle assembly further including a stacked layers of conveyor beds attached to each other, wherein each layer of conveyor bed comprises a pair of lower and upper guide support plates to support the container on the rollers on the conveyor beds.

Various example embodiments described herein, relates to the cradle assembly in the home position, wherein in the home position, the container is within the cradle assembly and is ready for dumping process.

Various example embodiments described herein, relates to the cradle assembly in the work position, wherein in the work position, the container is within the cradle assembly and is completing the dumping process.

Various example embodiments described herein, relates to the cradle assembly in the transit position, wherein in the transit position, the container is within the cradle assembly and undergoes a transition from the home position to the work position and vice-versa.

Various example embodiments described herein, relates to the cradle assembly with the lower guide support plates and the upper guide support plates are coupled to each other by support rods fastened using suitable fasteners in both the support plates.

Various example embodiments described herein, relates to the drive assembly which comprises a drive motor with a pinion gear, axle, timing belt, ring gear and pillow blocks with bearings.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
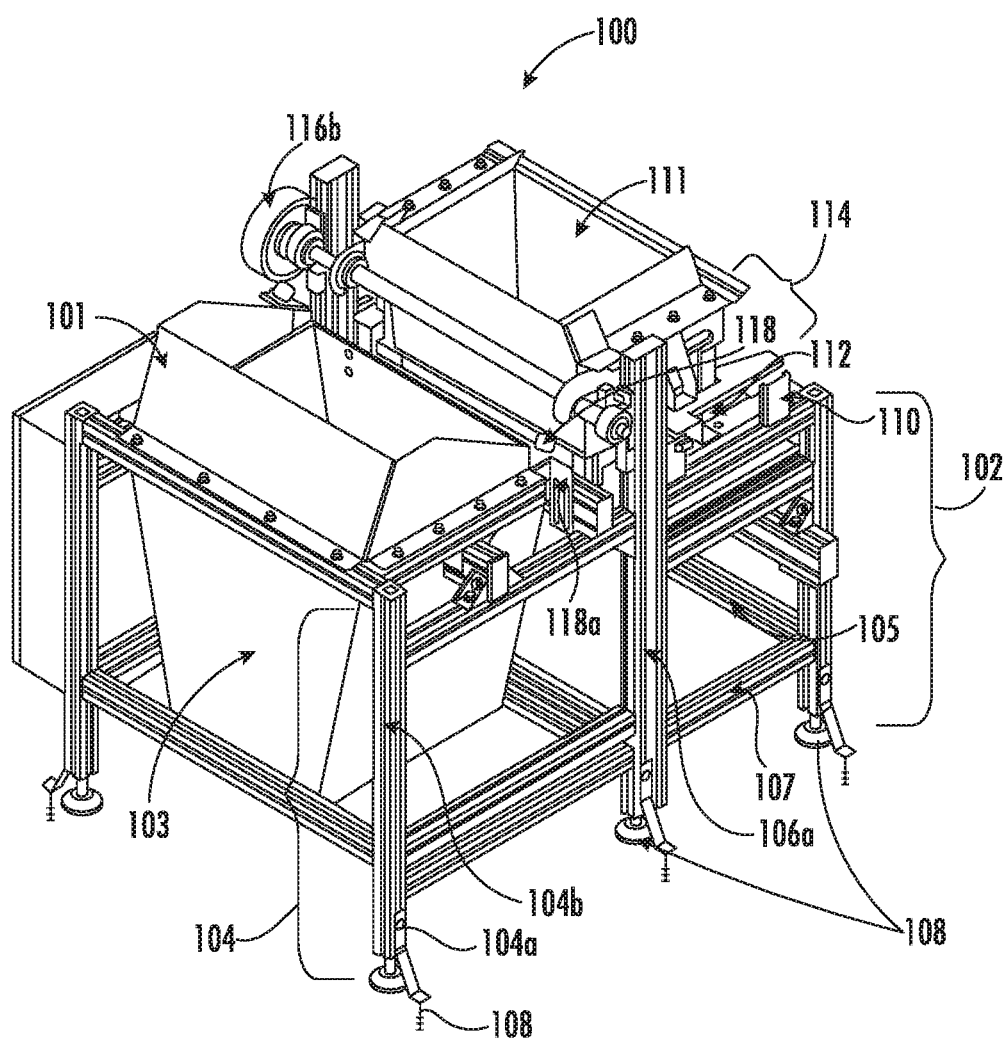
FIG. 1 illustrates a perspective view of a container dumping module in a material handling environment, in accordance with an embodiment of the present disclosure.

Some embodiments of the present disclosure will now be described more fully hereinafter with reference to the accompanying drawings, in which some, but not all embodiments are shown. Indeed, the concepts described here may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

As used herein, the terms "container," "tote", and similar terms may be used interchangeably. In addition, the terms "items", "articles" and similar terms may be used interchangeably. Further, the terms "work position", "home position" and "transit position" refers to different angled positions at which the container dumping module can be rotated in accordance with embodiments of the present disclosure. Thus, use of any such terms should not be taken to limit the spirit and scope of embodiments of the present disclosure.

Generally, dumping of items at various locations in a warehouse involves manual handling to remove the items for their tote pans or containers. In manual handling, it is necessary to manually remove the containers with the items and feed previously emptied containers in preparation for another operation in the warehouse involving those empty containers. This manual removing and feeding of the containers is labor intensive and time consuming which delays the processing of the items which in turn affects the throughput of material handling systems.

Specifically, at certain scenarios, dumping of the items at various locations in the warehouse may be facilitated by automatic dumping systems, for example, by a pick and place robot. These automatic dumping systems are expensive to use and involves frequent labor intensive maintenance. In other scenarios, the automatic dumping systems are standalone machines, for example, dumping systems may be operated by a multiplicity of hydraulic cylinders which are controlled by valves in the hydraulic circuits. These automatic dumping systems are bulky in nature and difficult to transport to various locations in the warehouse. Further, due to complex construction of these automatic dumping systems, using them in conjunction with existing material handling systems or conveyors in the warehouse may be laborious and may pose serious challenge to space constraints in the warehouse.

Various example embodiments described herein relates to a container dumping module which can be used along with existing conveyor system in a material handling environment. The container dumping module is maneuverable to various locations within the warehouse. The container dumping comprises a frame assembly, a drive assembly and a cradle assembly. The drive assembly is mechanically coupled to the frame assembly. The cradle assembly suspended on the drive assembly. The cradle assembly pivots from a home position to a work position or vice-versa under the influence of the drive assembly to dump items inside a container into another empty container or a conveyor bed.

According to some example embodiments, the cradle assembly may be positioned on the frame assembly. The cradle assembly comprises a pair of lower and upper guide support plates to support a container in a home position, a transit position, and a work position According to some example embodiments, the cradle assembly may comprise one or more finger-like structures provided at a lower end of the cradle assembly to support at least a portion of bottom face of a container in a home position or work position or transit position.

According to some example embodiments, the cradle assembly may comprise a first support plate, a second support plate and a third support plate. The first support plate and the second support plate positioned at an upper end of the cradle assembly to support at least a portion of top face of the container in a home position or work position or transit position. The third support plate positioned perpendicular to the first support plate and the second support plate to support at least a portion of one side face of the container in the home position or the work position or the transit position According to some example embodiments, the cradle assembly may comprise stacked layers of conveyor beds attached to each other, wherein each layer of conveyor bed comprises a pair of lower and upper guide support plates to support a container on rollers of the conveyor bed.

Thus, the container dumping module described herein in accordance with various example embodiments, provides a cradle assembly operated by a drive assembly. The drive assembly pivots the cradle assembly to dump items from the container. In this regard, the container dumping module is devoid of any complex mechanisms to dump the items from the container and requires less maintenance. Further, both the drive assembly and the cradle assembly are fitted on to the frame assembly which can be easily maneuvered from one place to another in a warehouse. In this regard, the container dumping module interoperable with any existing material handling systems.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

FIG. 1 illustrates a perspective view of a container dumping module in a material handling environment, in accordance with an embodiment of the present disclosure. In various embodiments, the container dumping module 100 may be used with any existing material handling system, for example, a conveyor bed, a truck trailer, a chute, another dumping module, a standalone empty container, and the like. In FIG. 1, an example embodiment of the container dumping module 100 used along with a chute 101 and a standalone empty container 103 is shown. The container dumping module 100 may comprise two frame assemblies. A first frame assembly 102 to support the container dumping module 100 and a second frame assembly 104 to support the chute 101 and the standalone empty container 103. According to an embodiment, the first frame assembly 102 and the second frame assembly 104 form a single molded frame structure. According to another embodiment, the first frame assembly 102 and the second frame assembly 104 are detachably coupled to each other.

In various embodiments, the first frame assembly 102 comprises a first pair of upright posts 106a on a first side 105 of the first frame assembly 102 and a second pair of upright posts 106b (not shown) on a second side 105a (not shown) of the first frame assembly 102 opposite to the first side 105. One or more cross-member supports 107 are fitted in between each of the upright posts 106a, 106b to provide additional support to the upright posts 106a, 106b. According to an embodiment, the first frame assembly 102 comprises a releasable lock 108 positioned on a bottom portion of the upright posts 106a, 106b to lock a movement of the first frame assembly 102. According to another embodiment, the first frame assembly 102 comprises casters with limit stop (not shown) to maneuver the first frame assembly 102 from one location to another location in the warehouse. According to an embodiment, the first frame assembly 102 comprises one or more photo eye sensors 110 positioned on the first side 105 of the first frame assembly 102 and on top of one of the cross-member support 107 and one or more reflectors (not shown) positioned on the second side 105a of the first frame assembly 102 opposite to the photo eye sensors 110.

In various embodiments, for example, a photo eye sensor 110 may generate a beam and detect any interruption of the beam reflected back by the reflector. Alternatively, the reflector could be a receiver for a beam generated by the phot eye sensor 110. The photo eye sensor 110 is used to detect a presence of a tote pan or a container 111 entering into the container dumping module 100. For example, when a leading edge of the container 111 passes the photo eye sensor 110, the beam from the photo eye may be blocked and the photo eye may not receive the reflected beam until a trailing edge of the container 111 passes the photo eye sensor 110. After the trailing edge of the container 111 passes the photo eye sensor 110, the beam is re-established and reflected back from the reflector. The re-establishment of the beam may be indicative that the container 111 has fully entered into the container dumping module 100. According to another embodiment, any type of container presence sensor can be used for any of the photo eye sensors 110, and as used herein, sensor refers to any device in any orientation which is used to detect the presence of a container 111 on the container dumping module 100, and is not limited to the photo eyes depicted. When the photo eye sensor 110 detects the presence of any container 111 which blocks the beam, it may transmit a signal to a controller (not shown) to notify the controller of the presence of the container 111. Further, when the photo eye sensor 110 detects that the beam is re-established, it may transmit a signal to a controller (not shown) to notify the controller that the container 111 is completely fed into the container dumping module 100 and ready for dumping operation.

Further, in other embodiments, the first frame assembly 102 can comprise a conveyor frame 112 that is supported on the upright posts 106a, 106b and the cross-member supports 107. The conveyor frame 112 can comprise a pair of rails (not shown) on which conveyor rollers are mounted. The conveyor rollers can comprise motorized rollers and non-motorized rollers. For example, when the photo eye sensor 110 detects the presence of any container 111 which blocks the beam, it may transmit a first signal to a controller (not shown) to notify the controller of the presence of a container 111. The controller may wait for a second signal from the photo eye sensor 110 which is indicative of the re-establishment of the blocked beam, however, in certain scenarios a wait time or an idle time between the first signal and the second signal may exceed a predefined time interval. In some embodiments, the controller may determine that the container 111 is unable to be fed into the container dumping module 100. Upon this determination, the controller may activate the motorized roller of the conveyor bed 112 to move the container 111 towards the container dumping module 100. After activating the motorized roller, when the controller receives the second signal (i.e., by the re-establishment of the blocked beam), the controller may de-activate the motorized roller to stop further movement of the container 111 into the container dumping module 100.

Further, the first frame assembly 102 comprises a cradle assembly 114 and a drive assembly 116. According to an embodiment, the cradle assembly 114 and the drive assembly 116 may be coupled to the upright posts 106a, 106b of the first frame assembly 102. In various embodiments, the drive assembly 116 drives the cradle assembly 114 and orients the cradle assembly 114 in different positions, for example, a home position, a transit position, and a work position. The cradle assembly can 114 comprise components as discussed in detailed in conjunction with FIG. 2 to hold the container 111 with the items to be dumped on to the chute 101 and the standalone empty container 103 of the second frame assembly 104.

Further, the first frame assembly 102 comprises proximity sensors 110a (as shown clearly in side view of FIG. 3) mounted on the upright posts 106a, 106b, more specifically, on opposite end of the upright posts 106a, 106b. The proximity sensors 110a are mechanical micro-switches which have binary outputs. The switch is closed when the cradle assembly 114 mechanically moves the micro-switch level. For example, when the cradle assembly 114 is in the home position, one of the proximity sensor 110a may be open and the other proximity sensor 110a may be closed. In other words, in the home position, binary output from one of the proximity sensor 110a may be toggled to high state and the other to a low state. The toggling from one state to another may be indicative of the position of the cradle assembly 114, for example, the position may be either the home position or work position. Based on the inputs from the proximity sensors 110a, the controller may determine whether to move the cradle assembly 114 from the home position to the work position or vice-versa. Further, in some examples, the binary outputs from the proximity sensors 110a may remain to be in low state for a predefined time interval indicative of a jam condition in the container dumping module 100.

According to an embodiment, the first frame assembly 102 comprises a first pair of bumper members 118 supported on a pair of angled plates 118a. The pair of angled plates 118a are affixed to one of the cross-member support 107 using one or more fasteners. The first pair bumper members 118, for example, may be bumper stops made of a rubber or elastomer piece to stop the cradle assembly 114 with a cushioned action which avoids damage to the chute 101 and the standalone empty container 103 when the cradle assembly 114 dispenses the items into the chute 101. For example, when the items of the container 111 are dispensed at a particular position from the container 111, the bumper member 118 may stop the cradle assembly 114 at the particular position such that the cradle assembly 114 is restricted for further rotation from the particular position. In some examples, the bumper member 118 may act as ant-vibration member to reduce a vibration caused due to sudden transition of the cradle assembly 114 to a particular position for dumping the items. Alternatively, in some examples, the bumper member 118 may be a spring damper.

The second frame assembly 104 comprises additional pairs of upright posts 104a and additional cross-member supports 104b to support the standalone empty container 103 and the chute 101. The additional pairs of upright posts 104a and additional cross-member supports 104b are attached to each other with one or more fasteners to form a support structure for positioning the standalone empty container 103 and the chute 101 on the support structure. According to an embodiment, the second frame assembly 104 may comprise container support structures to support one or more empty containers 103. For example, when the cradle assembly 114 of the container dumping module 100 is driven by the drive assembly 116 to different positions, then at a particular position the items on the container 111 held by the cradle assembly 114 may be dumped into the standalone empty container 103 through the chute 101. According to an embodiment, the second frame assembly 104 may comprise the releasable lock 108 positioned on a bottom portion of the upright posts 104a to lock a movement of the second frame assembly 104. According to another embodiment, the second frame assembly 104 may comprise casters with limit stop (not shown). Various components of the cradle assembly 114 of the first frame assembly 102 used for supporting the container 111 with the items will be described in detail in conjunction with FIG. 2.

Figure 2:
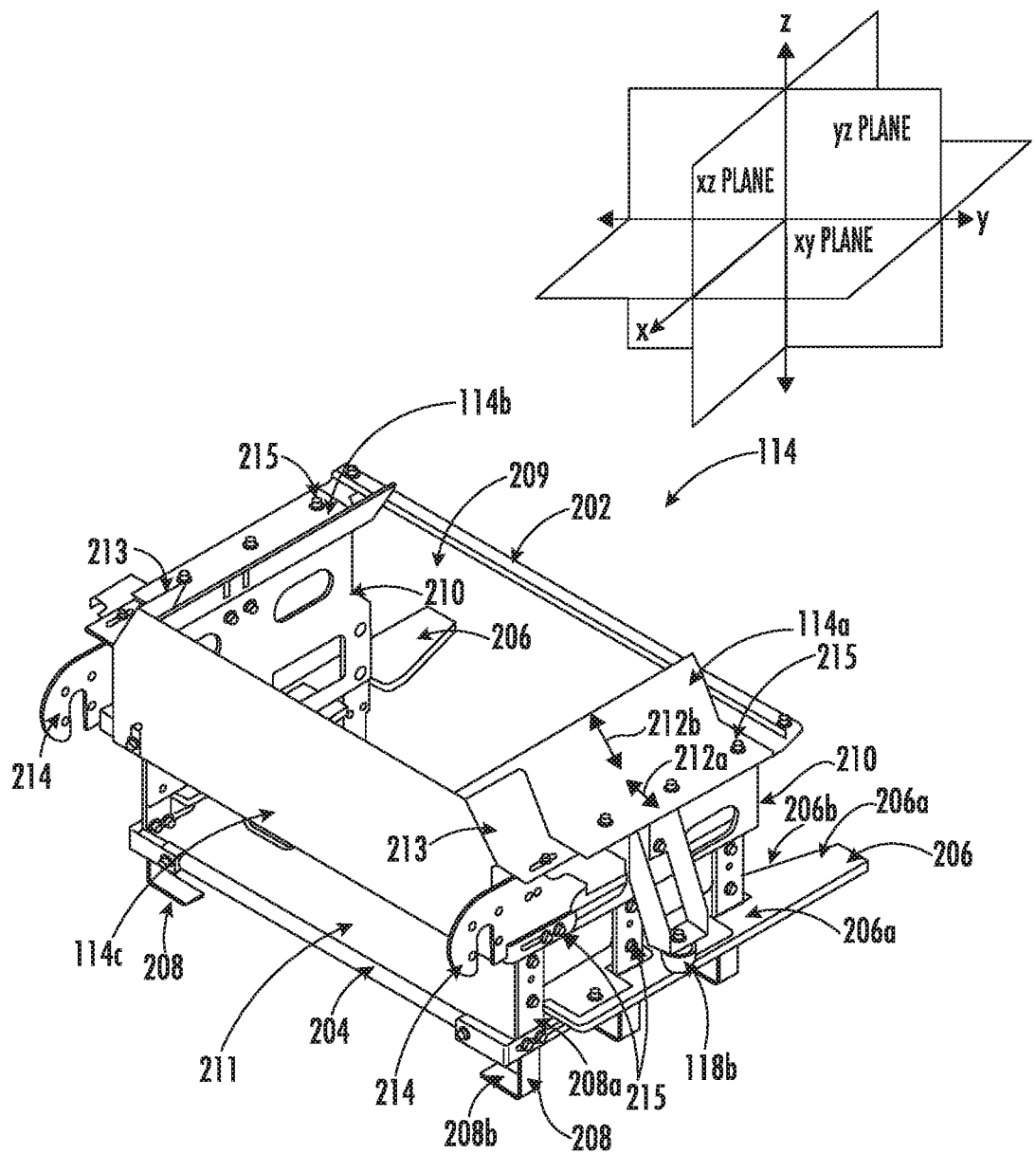
FIG. 2 illustrates a perspective view of a cradle assembly of the container dumping module of FIG. 1, in accordance with an embodiment of the present disclosure.

FIG. 2 illustrates a perspective view of a cradle assembly of the container dumping module of FIG. 1, in accordance with an embodiment of the present disclosure. The cradle assembly 114 comprises first support plate 114a, a second support plate 114b, a third support plate 114c, front rail 202, back rail 204, guide structures 206, one or more finger-like structures 208, and support brackets 210.

The first support plate 114a and the second support plate 114b positioned at an upper end 209 of the cradle assembly 114 to support at least a portion of top face of the container 111. The third support plate 114c positioned perpendicular to the first support plate 114a and the second support plate 114b to support at least a portion of one side face of the container 111. The front rail 202 positioned perpendicular to the first support plate 114a and the second support plate 114b to support at least a portion of the top face of the container 111. The back rail 204 positioned opposite to the front rail 202 and parallel to the third support plate 114c to provide additional support to the at least a portion of the one side face of the container 111. The one or more finger-like structures 208 provided at a lower end 211 of the cradle assembly 114 to support at least a portion of bottom face of a container 111. The first support plate 114a, the second support plate 114b, the third support plate 114c, the one or more finger-like structures 208, the front rail 202 and the back rail 204 are coupled to each other using the support brackets 210 and one or more fasteners such that the cradle assembly 114 forms a self-contained housing for the container 111 arriving at the container dumping module 100.

According to an embodiment, the first support plate 114a and the second support plate 114b may be angled plates. For example, one half 212a of the first support plate 114a and the second support plate 114b may form an obtuse angle with the other half 212b of the first support plate 114a and the second support plate 114b. The first support plate 114a and the second support plate 114b are provided at opposite end of the cradle assembly 114 with the angled halves 212a, 212b of the first support plate 114a and the second support plate 114b facing each other and separated by a distance substantially equal to a length of the container 111 arriving at the container dumping module 100. The first support plate 114a and the second support plate 114b are placed perpendicular or at substantially right angles to the front rail 202 and the back rail 204. In some example, the first support plate 114a and the second support plate 114b may be identical to each other. The first support plate 114a and the second support plate 114b are positioned in the "xy" plane and the angled halves 212a, 212b of the first support plate 114a and the second support plate 114b extend from the "xy" plane towards the "xz" plane.

According to an embodiment, the third support plate 114c comprises a pair of angled portions 213. Each of the angled portions 213 are affixed to the first support plate 114a and the second support plate 114b respectively using one or more fasteners 215. In some examples, the angled portions of the third support plate 114c may overlap with at least a portion of the first support plate 114a and the second support plate 114b. The third support plate 114c is positioned perpendicular or at substantially right angles to the first support plate 114a and the second support plate 114b, and the angled portions are held parallel to the first support plate 114a and the second support plate 114b. In some examples, the third support plate 114c may act as a connecting plate between the first support plate 114a and the second support plate 114b. In some examples, the third support plate 114c has a width and length greater than the first support plate 114a and the second support plate 114b. Further, in some examples, the angled portions 213 of the third support plate 114c may be substantially equal in length to the angled halves 212a, 212b of the first support plate 114a and the second support plate 114b. The third support plate 114c is positioned opposite to the front rail 202 and parallel to the back rail 204. The third support plate 114c is positioned in the "yz" plane opposite to the "xy" plane. The angled portions of the third support plate 114c extend in both the "xz" plane and the "xy" plane. According, to an embodiment, at least a portion of the first support plate 114a, the second support plate 114b and the third support plate 114c are fixedly coupled to the support brackets 210 at the upper end 209 using the one or more fasteners 215.

According to an embodiment, the front rail 202 is provided opposite to the third support plate 114c and perpendicular or substantially right angles to the first support plate 114a and the second support plate 114b. The front rail 202, for example, may be a straight flat rod positioned in between the first support plate 114a and the second support plate 114b. The front rail 202 is positioned in the "xy" plane. According an embodiment, the front rail 202 connects the first support plate 114a with the second support plate 114b. According to an embodiment, the first support plate 114a, the second support plate 114b, the third support plate 114c and the front rail 202 may form a substantially rectangular shaped structure with open center to accommodate an incoming open top container 111 filled with items ready for dumping.

According to an embodiment, the back rail 204 is provided opposite to the front rail 202 and perpendicular or substantially right angles to the first support plate 114a and the second support plate 114b. The back rail 204 is positioned below the third support plate 114c. The back rail 204 connects to the support brackets 210 at the lower end 211. The back rail 204 is positioned in the "yz" plane opposite to the "xy" plane. In some examples, the back rail 204 may be identical to the front rail 202. In some example, the front rail 202 and the back rail 204 may connect the support brackets 210.

According to an embodiment, the support brackets 210 may be positioned perpendicular or substantially right angles to the third support plate 114c, the front rail 202 and the back rail 204. According to an embodiment, the support brackets 210 may be provided in the "xz" plane. The support brackets 210 comprise a pair of curved hook members 214 and a second pair of bumper members 118b. The pair of curved hook members 214 to hang the cradle assembly 114 on to the frame assembly of the container dumping module 100. In some examples, the pair of curved hook members 214 may be integral part of the support brackets 210. In some examples, the pair of curved hook members 214 may extend beyond the third support plate 114c in the "xz" plane. The second pair of bumper members 118b are to facilitate a cushioned action which avoids damage to the cradle assembly 114 due to sudden change in its position. For example, when the items of the container 111 are dispensed at a particular position from the container 111 and return back to a normal position (as shown in FIG. 1), the bumper members 118b may stop the cradle assembly 114 at the normal position such that the cradle assembly 114 is restricted for further rotation from the normal position. In some example, the bumper member 118b may act as ant-vibration member to reduce a vibration caused due to sudden transition of the cradle assembly 114 to the normal position. Alternatively, in some examples, the bumper member 118b may be a spring damper. The first support plate 114a, the second support plate 114b, the third support plate 114c, and the front rail 202 are attached to the upper end portion of the support brackets 210 and the back rail 204 is attached to the lower end 211 of the support brackets 210.

According to an embodiment, the one or more finger-like structures 208 may be fixedly attached to the support brackets 210 with the one or more fasteners 215. Each of the finger-like structures 208 are placed equidistant from each other. A bottom portion 208b of the finger-like structures 208 are positioned in the "xy" plane and a top portion 208a of the finger-like structures 208 are positioned in the "xz" plane. According to an embodiment, the top portion 208a of the finger-like structures 208 are affixed to the support brackets 210 and the bottom portion 208b of the finger-like structures 208 are interposed between the rollers of the conveyor bed of the first frame assembly as shown in FIG. 1 to support the bottom of the container 111. In some example, the finger-like structures 208 are in the form of forks or tines configured to hold the bottom portion of the container 111 during a rotational motion of the cradle assembly 114.

According to an embodiment, the guide structures 206 are coupled to the support brackets 210 at a lower end 211 to guide the container 111 into the cradle assembly 114. Each guide structure 206 comprises protruding portions 206a extending away from the one or more finger-like structures 208, and at least a portion of the protruding portions 206a comprise angled cuts 206b to guide the container 111. The guide structures 206 are positioned in the "xy" plane opposite to the "yz" plane. The guide structures 206 are positioned perpendicular or at substantially right angles to the back rail 204. The protruding portions extend away from the support brackets 210 in the "xy" plane. The angled cuts 206b form acute angles with at least a portion of the protruding portions 206a. When the container 111 arrives at the cradle assembly 114, the guide structures 206 guide the container 111 into the cradle assembly 114 to secure the container 111 in between the first support plate 114a, the second support plate 114b, the third support plate 114c and the front rail 202. The angled cuts of the guide structures 206 adjust the position of the container 111 when misaligned with the cradle assembly 114. According to an embodiment, the guide structures 206 may be movably coupled to the support brackets 210 such that the angled cuts 206b may widen or narrow in the "xy" plane to compensate for the misalignment of the incoming container 111 and guide it into the cradle assembly 114. Various components of the drive assembly 116 which drives the cradle assembly 114 will be described in detail in conjunction with FIG. 3 and with a reference to previously discussed FIG. 1.

Figure 3:
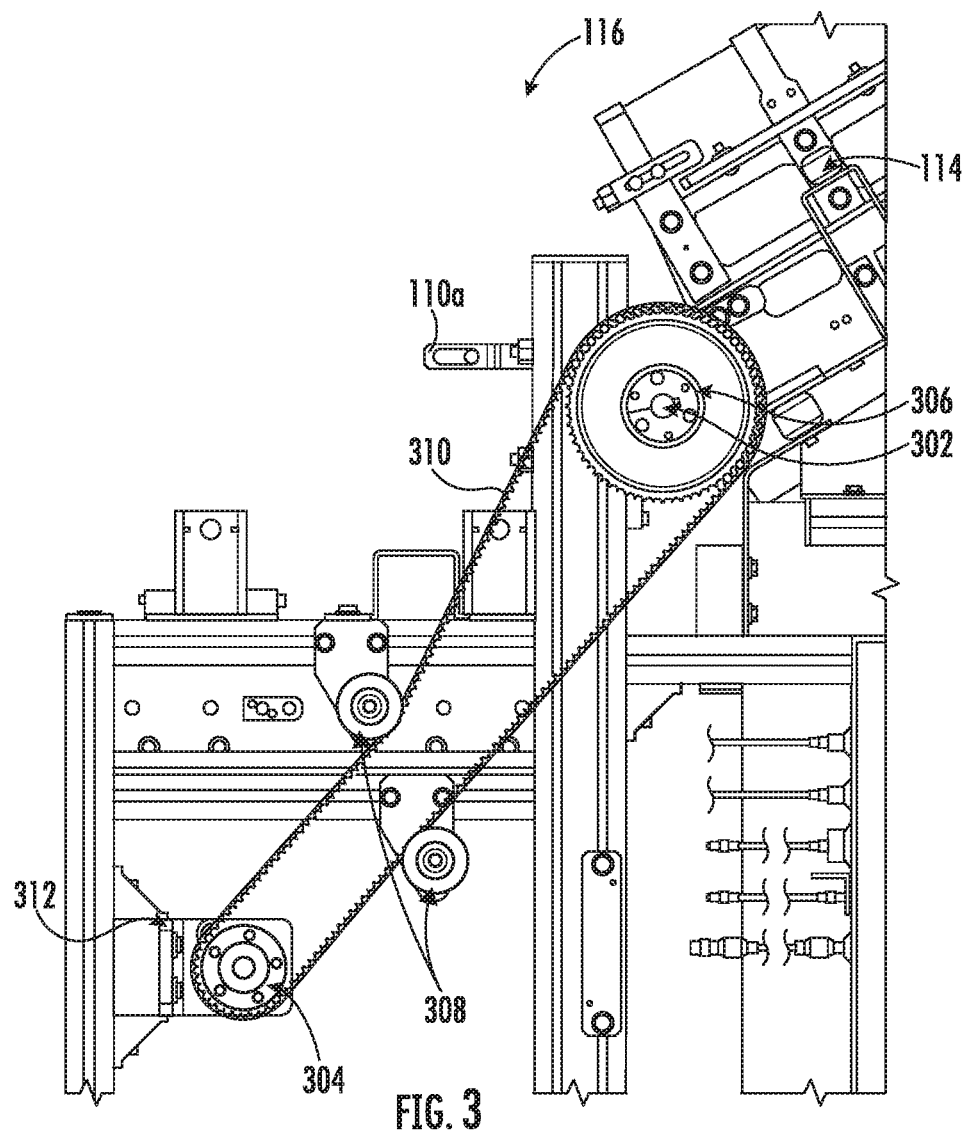
FIG. 3 illustrates a side view of a drive assembly of the container dumping module of FIG. 1, in accordance with an embodiment of the present disclosure.

FIG. 3 illustrates a side view of a drive assembly of the container dumping module of FIG. 1, in accordance with an embodiment of the present disclosure. The drive assembly 116 comprises an idler shaft or axle 302 (as clearly depicted in FIG. 4A), drive pulley 304, a driven pulley 306, idler pulley 308, timing belt 310, and a drive unit 312. According to an embodiment, the timing belt 30 may be toothed belt trained around the drive pulley 304 and the driven pulley 306. The drive pulley 304 and driven pulley 306 may also be toothed or geared. For example, the timing belt 310 may be provided with toothed projection on the interior face thereof, said toothed projections engages with the tooth of the drive pulley 304 and the driven pulley 306 to minimize relative slippage between the timing belt 310 and both the pulleys 304, 306. In some examples, the timing belt 310 may be made of Kevlar or other minimal stretch material. In some examples, the timing belt 310 may be made of a stainless-steel band having suitable slots or holes for engaging appropriately-configured teeth on the drive pulley 304 and the driven pulley 306. The timing belt 310 is kept in tension by the idler pulleys 308 urged against the backside of the timing belt 310 in low tension portion thereof between the drive pulley 304 and the driven pulley 306 to minimize slack. According to an embodiment, in order to provide adjustment of this tension, vertical adjustment of the position of drive pulley 304 and driven pulley 306 can be provided, using a suitable adjustment mechanism, such as set screws (not shown) or the like. Moving either the drive pulley 304 and the driven pulley 306 apart increases the tension of the timing, and moving them closer together reduces tension.

Figure 7:
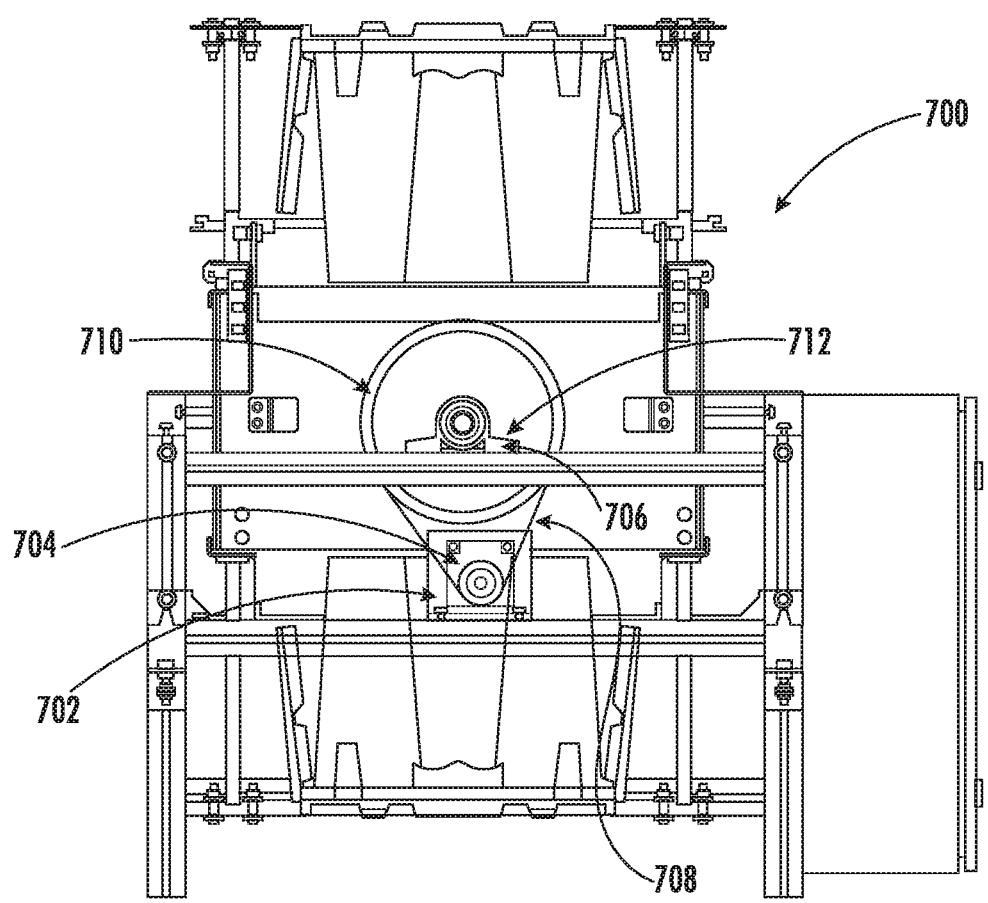
FIG. 7 illustrates a side view of a drive assembly of the container dumping module of FIG. 6, in accordance with another embodiment of the present disclosure.

According to an embodiment, the drive unit 312 may be attached to the first frame assembly 102. The drive unit 312 comprises a power source (not shown), such as an electric or hydraulic motor, which is operably connected to a drive axle (as shown in FIG. 7). In some examples, the electric motor may be a stepper motor. According to an embodiment, the electric motor may also be operably connected to a gear reducing unit. The drive pulley 304 is attached to the drive axle.

According to an embodiment, the driven pulley 306 may be attached to the idler shaft or axle 302 (as clearly depicted in FIG. 4A). The idler shaft 302 is attached to one of the upright posts 106a of the first frame assembly 102 and extends from the first side 105 of the first frame assembly 102 to the second side 105a of the first frame assembly 102. The ends of the idler shaft 304 are fitted to the upright posts using clamps and fasteners (as shown in FIG. 1). In an example, the idler shaft 302 may be attached to the first frame assembly 102 using pillow block with bearings 402 (as shown in FIG. 4A) to facilitate rotation of the idler shaft 302. One end of the idler shaft 302 is journaled into an opening of the driven pulley 306. The cradle assembly 114 of FIG. 2 is suspended on the idler shaft 302.

In operation, when the electric motor is actuated, it rotates the drive pulley 304 via the drive axle, which in turn moves timing belt 310. The drive pulley 304 transfers torque to the driven pulley 306 via the timing belt 310 looped around both pulleys 304, 306 and as result the driven pulley 306 rotates along with the idler shaft 302. The rotation of the idler shaft 302 induces rotation of the cradle assembly 114. Based on inputs received from sensors mounted on the frame assembly 102, the controller controls the electric motor to control the rotation of the cradle assembly 114.

Figure 4:
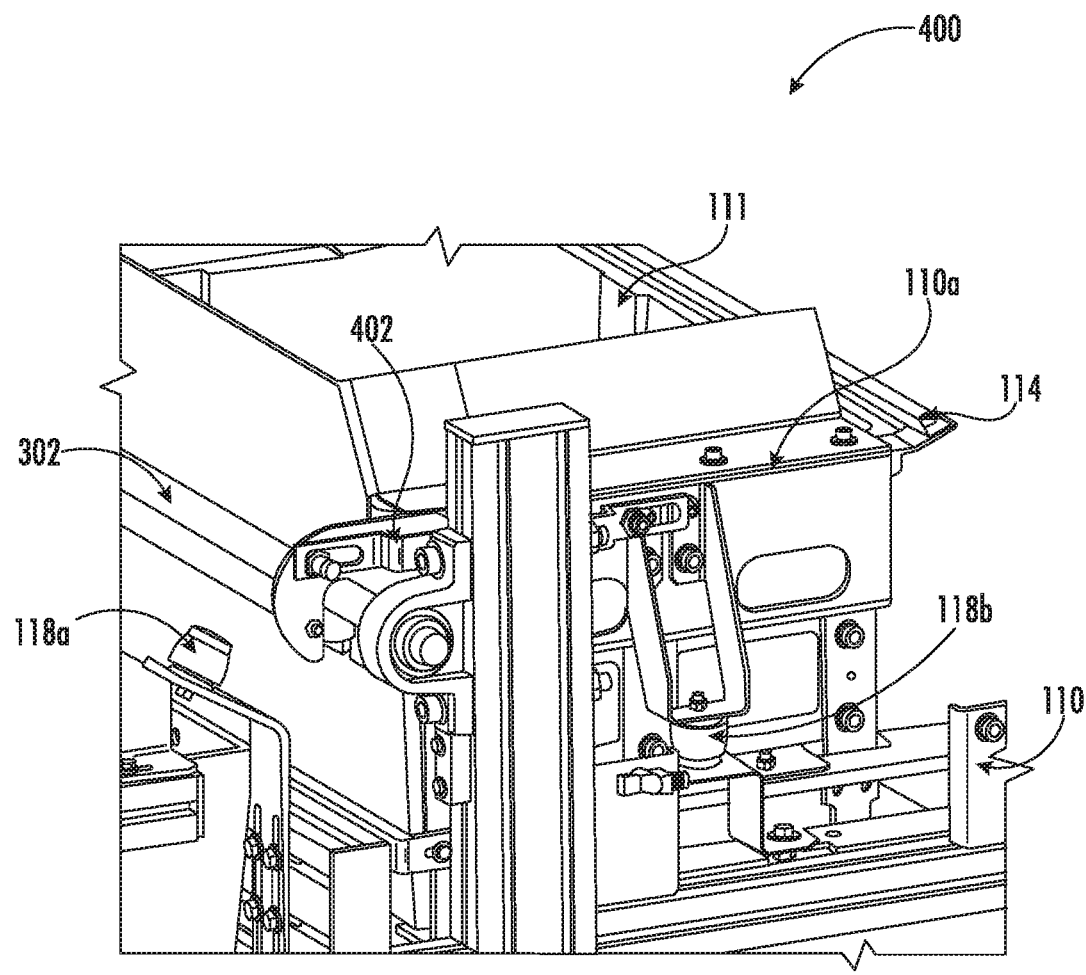
FIG. 4 illustrates a perspective view of the cradle assembly of FIG. 2 in a home position on the container dumping module, in accordance with an embodiment of the present disclosure.
Figure 5:
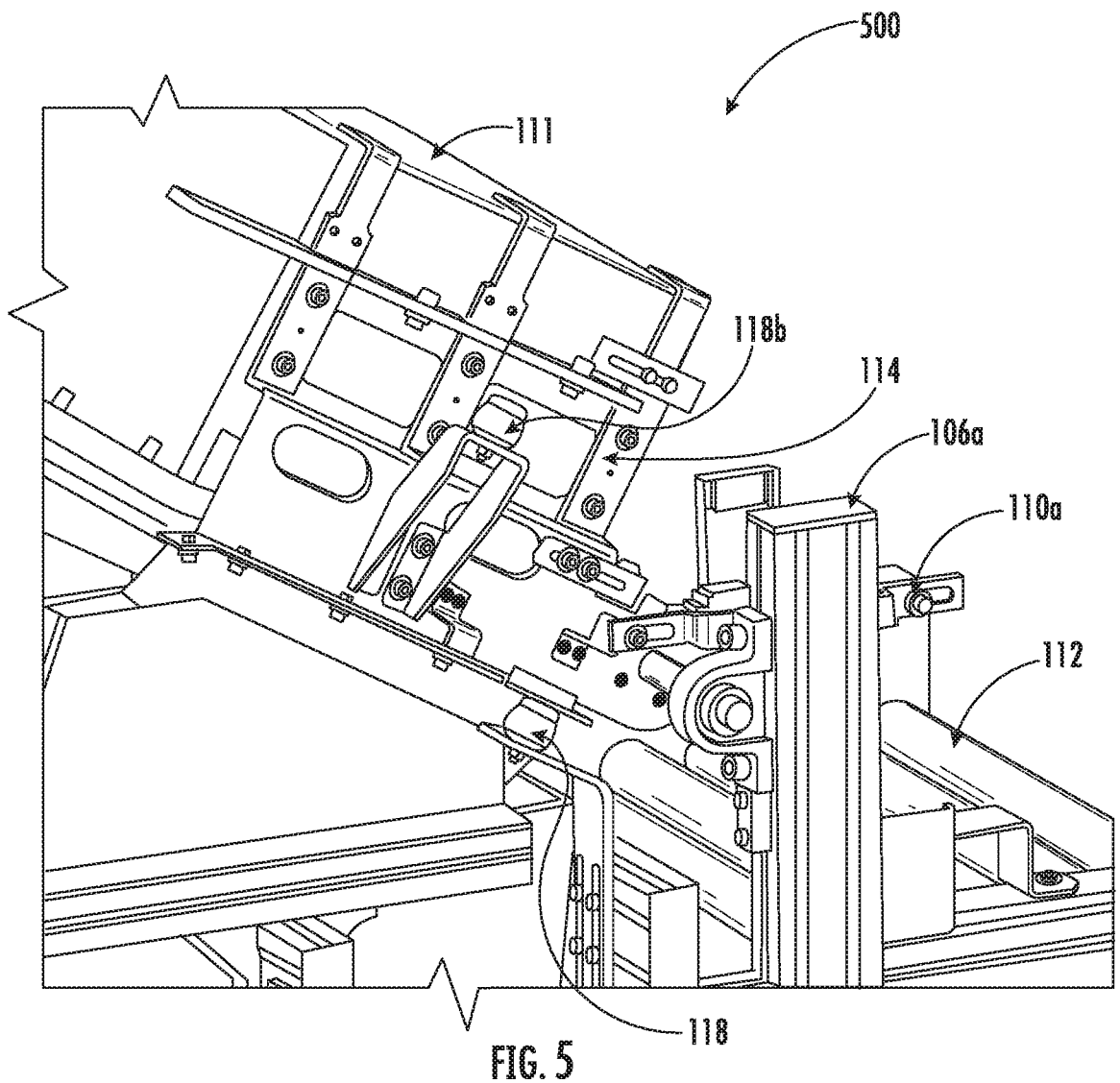
FIG. 5 illustrates a perspective view of the cradle assembly of FIG. 2 in a work position on the container dumping module, in accordance with an embodiment of the present disclosure.

FIG. 4 illustrates a perspective view of the cradle assembly of FIG. 2 in a home position on the container dumping module, in accordance with an embodiment of the present disclosure. As previously discussed, the cradle assembly 114 of the container dumping module 100 may be rotated to different positions along with the container 111. For example, the cradle assembly 114 may be rotated using the drive assembly 116 from a home position 400 to a work position 500 as shown in FIG. 5 and from a work position to a home position. In some examples, the cradle assembly 114 may be rotated to different intermediate positions (not shown) between the home position 400 and the work position 500. In FIG. 4, the cradle assembly 114 is depicted to be in the home position 400. In the home position 400, the container 111 is within the cradle assembly 114 and is ready for dumping process. In the work position 500, the container 111 is within the cradle assembly 114 and is completing the dumping process as shown in FIG. 5. In the intermediate positions, the container 111 is within the cradle assembly 114 and undergoes a transition from the home position 400 to the work position 500 and vice-versa. Based on inputs received from sensors 110, 110a mounted on the first frame assembly 102, the controller controls the stepper motor of the drive assembly 1116 to position the cradle assembly 114 in either the home position 400, the work position 500, or any intermediate positions.

When the container 111 is at the vicinity of the cradle assembly 114, the photo eye sensor 110 positioned on the first frame assembly 102 detects the presence of the container 111 and determines whether the container 111 has been fully inducted into the cradle assembly 114. The photo eye sensor 110 may issue a first input signal to the controller when the container 111 has travelled past the photo eye sensor 110, wherein the first signal is indicative of the cradle assembly 114 in the home position 400. Further, the controller receives a second input signal from the proximity sensors 110a, wherein the second signal is indicative of the cradle assembly 114 in the home position 400. Based on the first input signal and the second input signal received from the sensors 110, 110a, the controller determines whether the container 111 is ready for dumping. As shown in FIG. 4A, at the home position 400, the container 111 is fully inside the cradle assembly 114 with support plates 114a, 114b, 114c, finger-like structures 208 and rails 202, 204 of the cradle assembly 114 holding various surfaces of the container 111.

FIG. 5 illustrates a perspective of the cradle assembly of FIG. 2 in a work position on the container dumping module, in accordance with an embodiment of the present disclosure. As previously discussed, the cradle assembly 114 is rotated to the work position 500 from the home position 400 when the controller receives the first input signal and the second input signal. The controller activates the drive assembly 116, for example, the drive unit 312 of the drive assembly 116 upon receiving the first input signal and the second input signal to rotate the cradle assembly 114. The cradle assembly 114 is lifted by the drive assembly 116 from the home position 400. In some examples, the cradle assembly 114 may be rotated to less than a 180-degree rotation to transform to the work position 500. As shown in FIG. 4B, the stopper members 118, 118b limits further rotation of the cradle assembly 114 at the work position 500. As shown in FIG. 4B, at the work position, the container 111 is fully inside the cradle assembly 114 with support plates 114a, 114b, 114c, finger-like structures 208 and rails 202, 204 of the cradle assembly 114 holding various surfaces of the container 111 during the transition from the home position 400 to the work position 500.

At the work position 500, the proximity sensor 110a transmits a third input signal indicating the controller that the cradle assembly 114 is now in the work position 500. The controller upon receiving the third signal determines whether the container 111 is to be transformed back to the home position 400. In some example, vision sensors (not shown) may be placed on the frame assembly 102 to determine whether all the items in the container 111 are dumped into the standalone empty container 103. These vision sensors may alert the controller when all the items from the container 111 are emptied and in response, the controller may transform the cradle assembly 114 back to the home position 400 from the work position 500. According to an embodiment, the controller may be preprogrammed with a wait period to transform the cradle assembly 114 back to the home position 400 from the work position 500. For example, after receiving the third input signal from the proximity sensor 110a, the controller may wait for a wait period of 10 secs, which is a preprogrammed time gap provided from all the items in the container 111 to be dumped. After the wait period, the controller may activate the drive unit 312 of the drive assembly 116 to transform the container 111 from the work position 500 to the home position 400.

According to an embodiment, when the cradle assembly 114 returns back to the home position 400 from the work position 500, the proximity sensor 110a may again be activated providing a fourth input signal to the controller which is indicative of the cradle assembly 114 returning back to the home position 400. The controller receives the fourth input signal and activates the motorized roller of the conveyor bed 112 of the container dumping module 100 to move the container 111 in a direction away from the cradle assembly 114. In some examples, the controller may track the number of times dumping cycle is repeated and may increment a counter value stored in the memory and validate the count against a pre-defined fixed value. The controller stop the dumping operation after the count has reached the pre-defined fixed value. In this regard, the cradle assembly 114 completes the dumping cycle when it rotates from the home positon 400 to the work position 500 and return back from the work position 500 to the home position 400.

Figure 6:
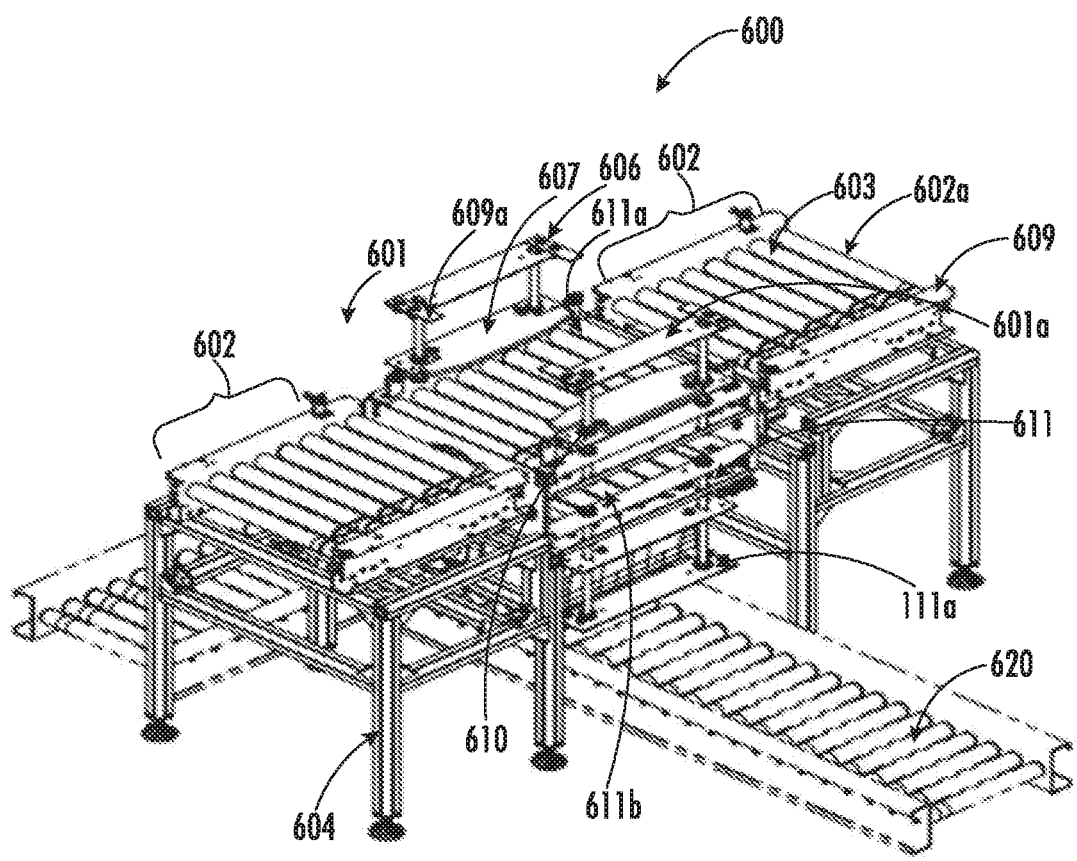
FIG. 6 illustrates a perspective view of a container dumping module in a material handling environment, in accordance with another embodiment of the present disclosure.
Figure 8:
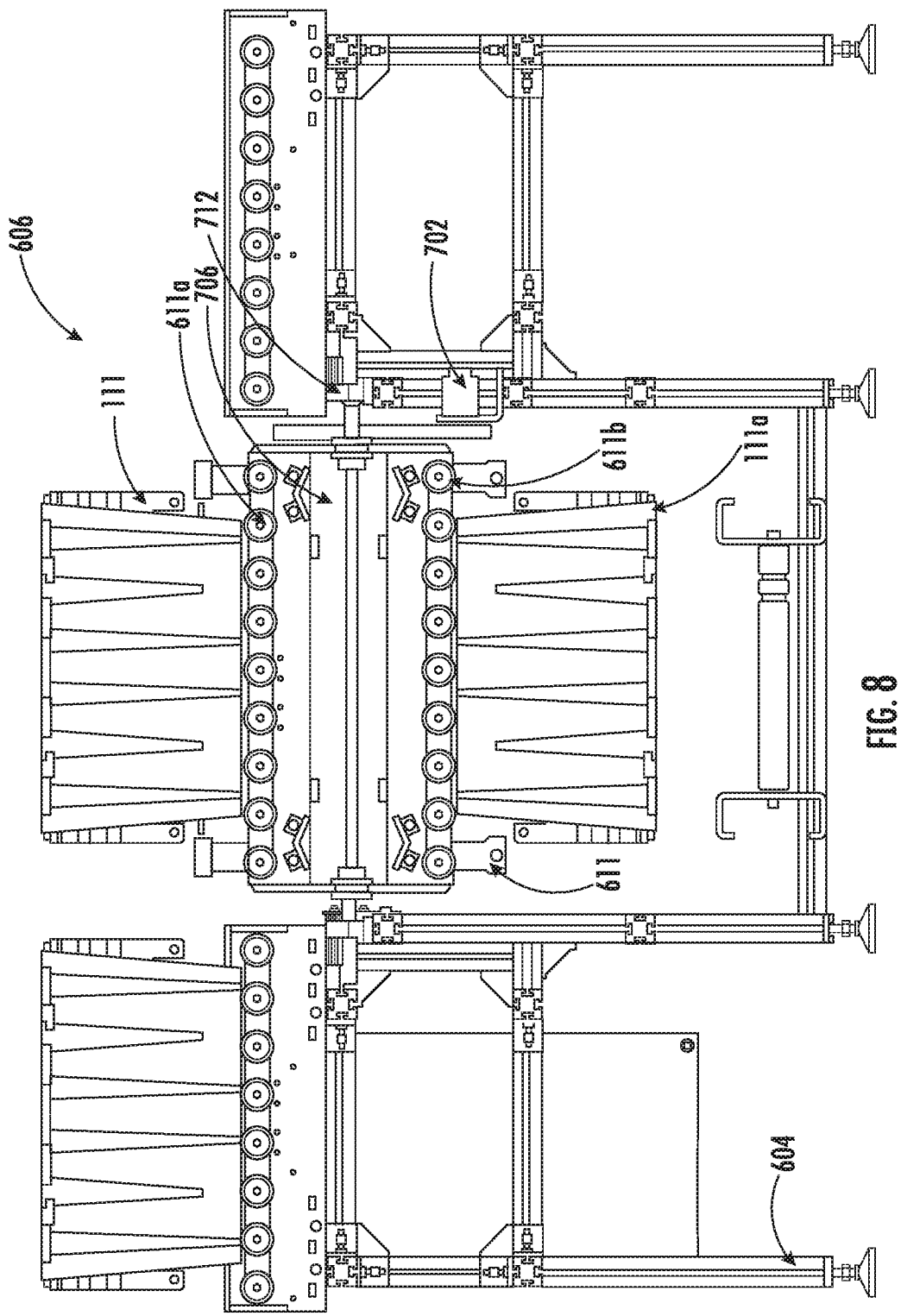
FIG. 8 illustrates a front sectional view of the container dumping module of FIG. 6, in accordance with another embodiment of the present disclosure.

FIG. 6 illustrates a perspective of a container dumping module in a material handling environment, in accordance with another embodiment of the present disclosure. The container dumping module 600 is installed as a part of a conveyor system 601 in between conveyor beds 602. The container dumping module 600 comprises a frame assembly 604 and a cradle assembly 606. The frame assembly 604 comprises plurality for conveyor beds 602 with rollers 603. In FIG. 5, two conveyor beds 602a, 602b are provided and the cradle assembly 606 is installed in between the two conveyor beds 602a, 602b. The frame assembly further comprises a drive assembly (as shown in FIGS. 7 and 8) to drive the cradle assembly 606 to one of a home position, a transit position, or a work position. The cradle assembly 606 is pivotably positioned on the frame assembly 604. The cradle assembly 606 comprises lower guide support plates 607, upper guide support plates 609, stacked layers of conveyor beds 611. The lower guide support plates 607 and the upper guide support plates 609 support a container 111 in the home position, the transit position, and the work position.

The stacked layers of conveyor beds 611 are attached to each other, wherein each layer of conveyor bed 611 comprises a pair of lower guide support plates 607 and upper guide support plates 609 to support the container on the rollers 602a of the conveyor beds 602. For example, in the home position, a first conveyor bed 611a from the stacked layers of conveyor beds 611 may receive the container 111 (not shown) with items and the second conveyor bed 611b is positioned below the first conveyor bed 611a. In contrast, in the work position, the second conveyor bed 611b receives the container 111 with the items and the first conveyor bed 611a is positioned below the second conveyor bed 611b. In this regard, a position of the first conveyor bed 611a and the second conveyor bed 611b alters iteratively during each dumping cycle. For example, in a first dumping cycle, the first conveyor bed 611a may receive the container 111 in the home position and dump the items in the container 111 into another conveyor system or a chute in the work position. In a second dumping cycle, the second conveyor bed 611b may receive the container 111 in the home position and dump the items in the container 111 into another conveyor system or a chute in the work position. In this regard, when the first conveyor bed 611a is in the home position, the second conveyor bed 611b in positioned below the first conveyor bed 611a in a work position and when the first conveyor bed 611a is in the work positon, the second conveyor bed 611b in positioned above the first conveyor bed 611a in a home position. In this manner, the stacked layers of conveyor beds 611 are able to handle more than one containers at a single dumping cycle. For example, during the first dumping cycle, the first conveyor bed 611a in the home position may be handling the container 111 filled with items yet to be dumped and the second conveyor bed 611b in the work position may be handling an empty container 111a (as shown in FIG. 6) whose items are already dumped into another conveyor system or chute. FIG. 6 shows an example of another conveyor system 620 position below the conveyor system 601 having the cradle assembly 606. The first conveyor bed 611a and the second conveyor bed 611b comprises motorized and non-motorized rollers. The motorized rollers are activated to either pull in the container 111 with the items into the cradle assembly or push out empty container after the dumping is completed.

Each of the upper guide support plate 609 comprise a pair of flap plates 609a to support a top of the container 111 at the home position and the work position. The lower guide support plates 609b are protruding plates partially covering a negligible portion of the rollers 602a of the stacked layers of conveyor beds 611. The protruding plates support side surfaces of the container 111 at the home position and the work position. In some examples, the protruding plates may be made of elastomer or rubber material that flexes to an extent to accommodate the container 111 firmly in between the protruding plates. The lower guide support plates 607 and the upper guide support plates 609 are coupled to each other by support rods 610 fastened using suitable fasteners in both the support plates 607, 609. Further, the drive assembly of the container dumping module facilitating the movement of the cradle assembly to various positions will now be described in detail in conjunction with FIGS. 7 and 8.

FIG. 7 illustrates a side view of a drive assembly of the container dumping module of FIG. 6, in accordance with another embodiment of the present disclosure. As shown in FIG. 7, the drive assembly 700 comprises a drive motor 702 with a pinion gear 704, axle 706, timing belt 708, ring gear 710 and pillow blocks with bearings 712. The timing belt 708 is wound over the ring gear 710 and the pinion gear 704. The ring gear 710 and the pinion gear 704 are provided with a series of alternate projections and recesses with a constant pitch in the outer circumferential surface. The timing belt 708 is provided at its reverse surface with a series of shallow grooves which are fitted to the projections and recesses of the pinion and ring gear 710. Use of the timing belt 708 minimizes production of metallic sound when used with the gears providing accurate transmission without causing slippage. In some examples, the body of the timing belt 708 may be formed of rubber material or steel wire. The pinion gear 704 provided with drive motor 702 act as driving members of the drive assembly 700 and the ring gear 710 with the axle 706 act as driven members of the drive assembly 700. The driving members drives the driven members through the use of the timing belt 708 wrapped around both the driving members and the driven members. According to an embodiment, the ring gear 710 and the pinion gear 704 may be used to control a speed of the rotation of the cradle assembly 606 and a direction of rotation of the cradle assembly 606. In some examples, the axle 706 may be attached to the frame assembly 604 using a pillow block with bearings 712 to facilitate rotation of the axle 706. The axle 706 is attached to the ring gear 710. The ring gear 710 may transfer a torque supplied by the drive motor 702 from the pinion gear 704 to the axle 706 to rotate the axle 706 and thereby rotate the cradle assembly 606. The rotation of the axle 706 facilitates the rotation of the cradle assembly 606. The ends of the axle 706 are fixed to the frame assembly 604 as shown in FIG. 8. In FIG. 8 a front sectional view of the container dumping module of FIG. 6 is shown, in accordance with another embodiment of the present disclosure. In FIG. 8, the axle 706 is attached to the frame assembly 604 by means of pillow blocks with bearings 712 to rotate the axle 706. The drive motor 702 rotates the pinion gear 704 which in turn rotates the ring gear 710 using the timing belt 708. The ring gear 710 in turn rotates the axle 706 in order rotate the cradle assembly 604 to various positions. In FIG. 8, it is seen that the axle 706 is positioned in between the first conveyor bed 611a and the second conveyor bed 611b to drive the stacked layers of conveyor beds 611 simultaneously to either the home position or the work positon. In this regard, the cradle assembly 606 is able to handle more than one containers 111, 111a at a single dumping cycle by the rotation of the axle 706 under the influence of the drive motor 702 and gears 704, 710.

Figure 9:
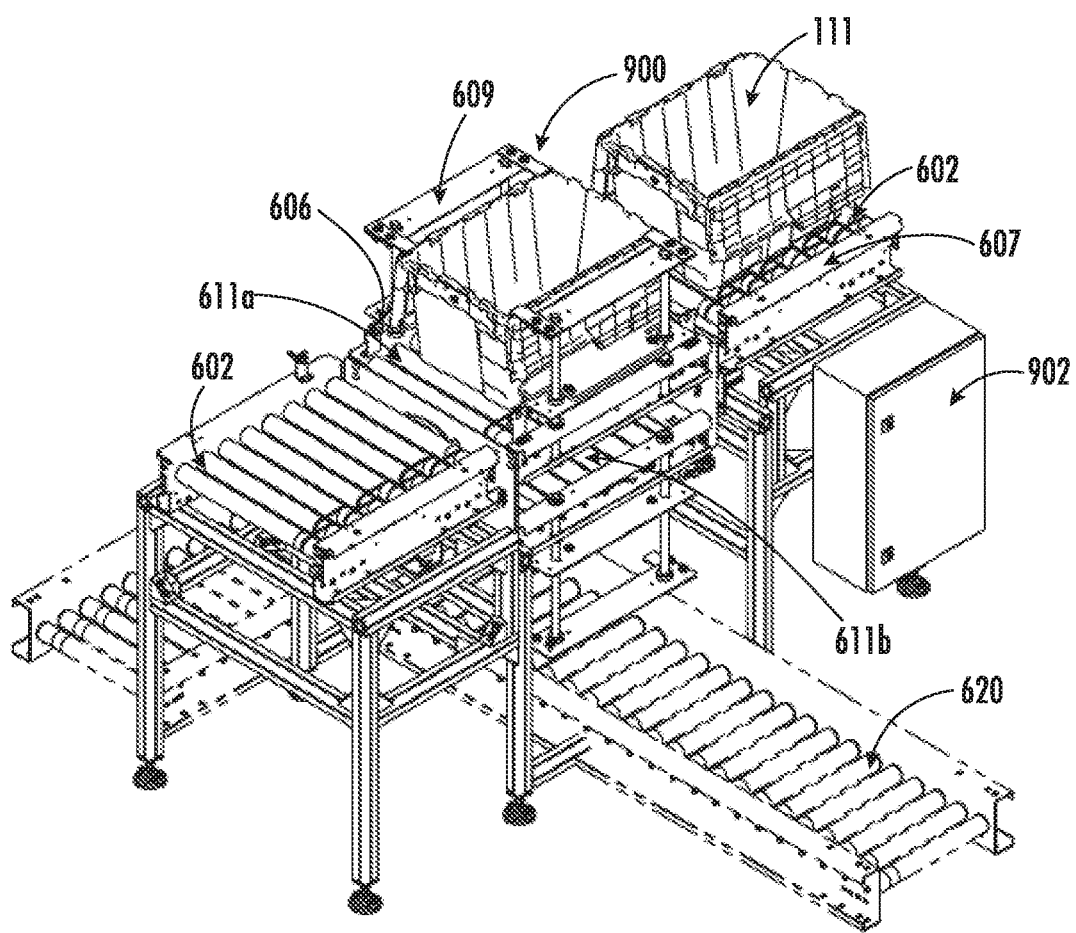
FIG. 9 illustrates a perspective view of the container dumping module in a home position, in accordance with another embodiment of the present disclosure.

FIG. 9 illustrates a perspective view of the container dumping module in a home position, in accordance with another embodiment of the present disclosure. In operation, when a container 111 enters into the cradle assembly 606 from neighboring conveyor zones or beds 602, a first conveyor bed 611a of the cradle assembly 606 may receive the container 111 and position it using the upper guide support plate 609 and the lower guide support plate 607. For example, the container 111 may automatically position inside the cradle assembly 606 when it encounters the upper guide support plate 609 and the lower guide support plate 607. In some example, an operator may manually position the container 111 in the cradle assembly 606 using the upper guide support plate 609 and the lower guide support plate 607. In this regard, when the container 111 filled with items is held in position using the upper guide support plate 609 and the lower guide support plate 607. The container 111 is now in the home position 900 as shown in FIG. 9. In some examples, a photo eye sensor (not shown) may indicate a controller 902 of the container dumping module 601 that the container 111 is in the home position 900 by detecting a leading and trailing edge of the container. In some examples, an operator may trigger a push button or enter a manual input to indicate the controller 902 that the container 111 is in the home position 900.

Figure 10:
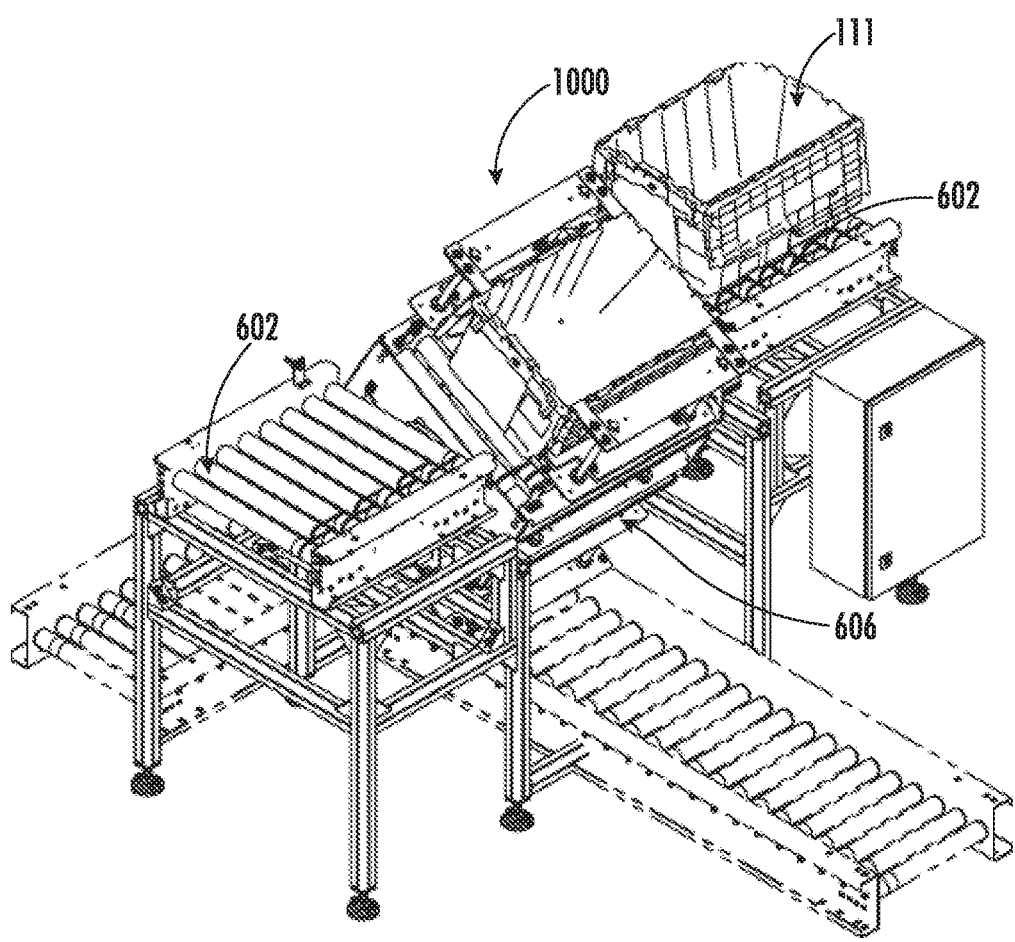
FIG. 10 illustrates a perspective view of the container dumping module in a transit position, in accordance with another embodiment of the present disclosure.
Figure 11:
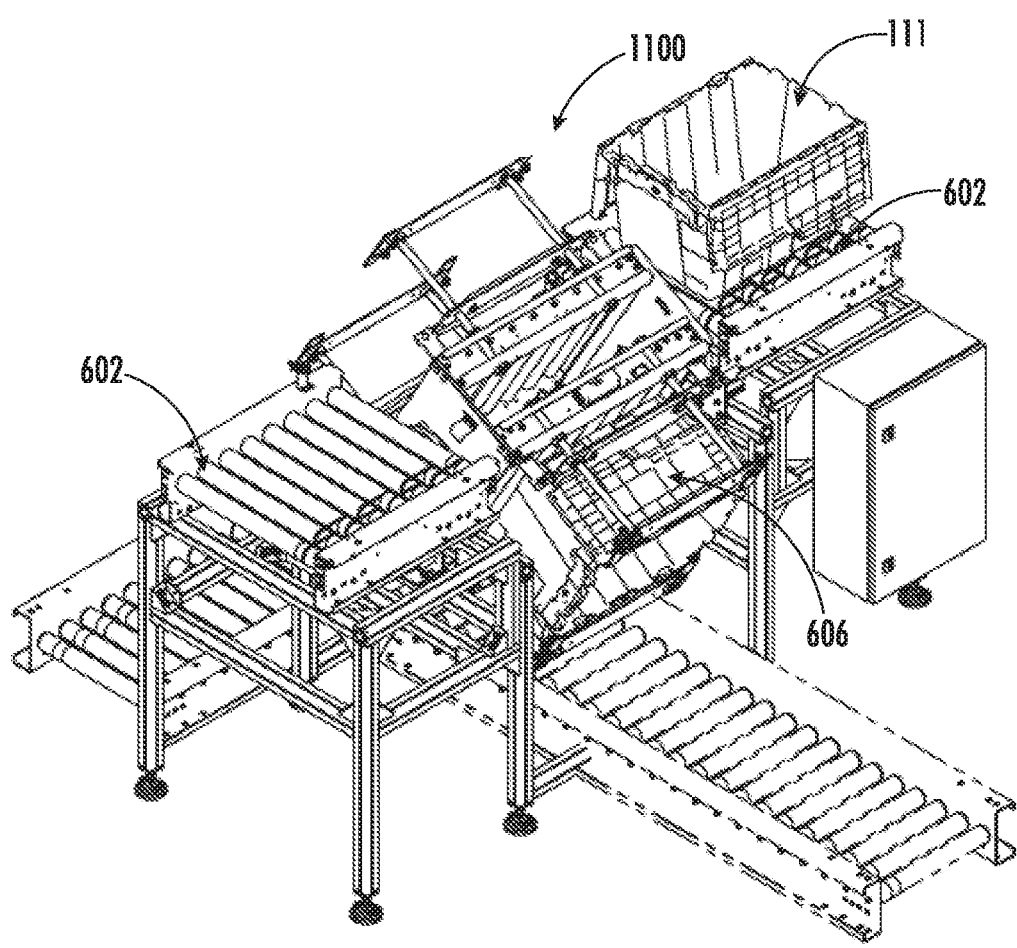
FIG. 11 illustrates a perspective view of the container dumping module in a work position, in accordance with another embodiment of the present disclosure.

After receiving inputs from the photo eye sensor or the operator, the controller 902 actuates the drive assembly 700 to start a rotation of the cradle assembly 604. For example, the controller 902 may transmit control signals to the drive motor 702 to actuate the cradle assembly 606. The controller 902 continues to transmit the control signals to the drive motor 702 until the cradle assembly 606 reaches a work position 1100 as shown in FIG. 11. According to an embodiment, angle of rotation of the cradle assembly 606 may be controlled by the controller 902 depending on the items handled by the container dumping module 601. For example, if the container dumping module 601 is handling fragile items, then a final angle at which the cradle assembly 606 is rotated may be 360-degrees from the home position 900 and if the container dumping module 601 is handling polybags or mails, the final angle at which the cradle assembly 606 is to be rotated is 180-degrees from the home position 900. In this regard, the controller 902 may be preprogrammed to rotate the cradle assembly 606 based on the items handled by the container dumping module 601. In some examples, the 360-degree position may be the work position 1100 of the cradle assembly 606. According to an embodiment, the cradle assembly 606 may be altered or transformed to different angles between the home position 900 and the work position 1100 as shown in FIG. 10. In FIG. 10, the cradle assembly 606 is in the transit position 1000. In some example, the transit position 1000 may be 120-degrees from the home position 900. In some examples, items in the container 111 may be dumped at the transit position 1000. In this regard, the items in the container 111 may be dumped into a chute or another conveyor 620 in the work position 1100 or the transit position 1000. The speed at which the cradle assembly 606 transits from the home position 900 to the work position 1100 or the transit position 1000 may depend upon the characteristics of the items handled by the container dumping module 601. The upper and lower guide support plates 609, 607 support the container 111 at the home position 900, the work position 1100, and the transit position 1000 to avoid slippage of the container 111 from the cradle assembly 606.

After rotating the container 111 to either the work position 1100 or the home position 900, the controller 902 de-activates the drive assembly 700 for a predefined time interval. The second conveyor bed 611b of the cradle assembly 606 receives another container filled with items in this predefined time interval. According to an embodiment, while deactivating the drive assembly 700, the controller 902 may activate the motorized rollers of the second conveyor bed 611b to push an empty container from the second conveyor bed 611b into a neighboring downstream conveyor zone or bed 602. When the other photo eye senor of the second conveyor bed 611b signals the controller 902 that another container arriving from the neighboring upstream conveyor zone or bed 602 is fully within the cradle assembly 606 and held in place by the upper and lower guide support plates 609, 607, the controller 902 re-activates the drive assembly 700 to start the rotation of the cradle assembly 606 from the home position 900 to either the work position 1100 or the transit position 1000 depending on the items handled by the another container. For example, when the second conveyor bed 611b is transformed to the work position 1100, the first conveyor bed 611a may be in the home position 900 ready to receive yet another container and push the empty container. In this regard, in a particular dumping cycle, when one container is in the home position 900, the other container may be in the work position 1100. Therefore, two containers can be handled by the cradle assembly 606 in a single dumping cycle.

According to another embodiment, the container dumping module 601 may transform the cradle assembly 606 from the home position 900 to the work position 1100 and vice-versa irrespective of the characteristics of the items handled by the container dumping module 601. In such scenarios, the cradle assembly 606 may not alter to an intermediate transit position 1000. For example, when the cradle assembly 606 is at a 0-degree angle, then it may be in the home positon 900 and when the cradle assembly 606 is at any other angle other than 0 degree from the home position 900, then it is at the work position 1100. Further, in a single dumping cycle, the cradle assembly 606 may be both in the home position 900 and the work position 1100. For example, the first conveyor bed 611a may be in the home position 900 while the second conveyor bed 611b may be in the work position 1100 and vice versa. In this regard, in one dumping cycle, a container can be loaded and another container can be dumped. Therefore, the container dumping module may handle more than one containers efficiently at any instant of time and may be used with existing material handling systems.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium.

In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, comprises compact disc (CD), laser disc, optical disc, digital versatile disc (DVD), floppy disk, and blu-ray disc where disks usually reproduce data magnetically, while discs reproduce data optically with lasers. Combinations of the above should also be comprised within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The foregoing description of an embodiment has been presented for purposes of illustration and description. It is not intended to be exhaustive or to limit the disclosure to the precise form disclosed. Obvious modifications or variations are possible in light of the above teachings. The embodiment was chosen and described in order to best illustrate the principles of the disclosure and its practical application to thereby enable one of ordinary skill in the art to best utilize the disclosure in various embodiments and with various modifications as are suited to the particular use contemplated. Although only a limited number of embodiments of the disclosure are explained in detail, it is to be understood that the disclosure is not limited in its scope to the details of construction and arrangement of components set forth in the preceding description or illustrated in the drawings. The disclosure is capable of other embodiments and of being practiced or carried out in various ways. Also, in describing the embodiment, specific terminology was used for the sake of clarity. It is to be understood that each specific term comprises all technical equivalents which operate in a similar manner to accomplish a similar purpose.

The invention claimed is:

1. A container dumping module comprising:
    a frame assembly;
    a drive assembly mechanically coupled to the frame assembly; and
    a cradle assembly suspended on the drive assembly, wherein the cradle assembly comprises:
        one or more finger-like structures having a top portion and a bottom portion in orthogonal planes, provided at a lower end of the cradle assembly, wherein the bottom portion supports at least a portion of bottom face of a container in one of a home position, a work position, and a transit position during a rotational motion of the cradle assembly;
        a first support plate and a second support plate positioned at an upper end of the cradle assembly to support at least a portion of a top face of the container in one of the home position, the work position, and the transit position; and
        a third support plate positioned perpendicular to the first support plate and the second support plate to support at least a portion of a side face of the container in one of the home position, the work position, and the transit position, wherein the home position, the work position, and the transit position is determined based on a type of item handled by the cradle assembly of the container dumping module;
  wherein the one or more finger-like structures, the first support plate, the second support plate, and the third support plate are mechanically coupled to each other with a support bracket, and
  a guide structure coupled to the support bracket to guide the container into the cradle assembly, wherein the guide structure comprises a protruding portion extending away from the one or more finger-like structures, and wherein the protruding portion comprises an angled cut to guide the container.

2. The container dumping module of claim 1, wherein the drive assembly comprises:
  an idler shaft extending from a first side of the frame assembly to a second side of the frame assembly and the cradle assembly is fastened to opposite ends of the idler shaft.

3. The container dumping module of claim 1, wherein the cradle assembly further comprises:
  a front rail positioned perpendicular to the first support plate and the second support plate to support at least a portion of the top face of the container in the home position, the work position, and the transit position; and
  a back rail positioned opposite to the front rail and parallel to the third support plate to provide additional support to the at least a portion of the side face of the container in the home position, the work position, and the transit position.

4. The container dumping module of claim 1, further comprising:
  an additional frame assembly is coupled to the frame assembly, wherein the additional frame assembly comprises:
    a chute to guide items into an empty container; and
    a container support structure to hold the empty container.

5. The container dumping module of claim 1, wherein the frame assembly comprises a conveyor bed comprising plurality of rollers with the finger-like structures interposed between the plurality of rollers.

6. The container dumping module of claim 1, wherein the frame assembly comprise one or more sensors to monitor the container at one of: the home position, the work position and the transit position, wherein in the work position, the cradle assembly is configured to be rotated 360-degrees relative to the home position.

7. The container dumping module of claim 1, wherein the drive assembly further comprises a drive pulley, a driven pulley, idler pulley, timing belt, and a drive unit.

8. The container dumping module of claim 1, wherein the cradle assembly further comprises:
  a bumper stop made of a rubber or elastomer piece to stop the cradle assembly with a cushioned action in the home position.

9. The container dumping module of claim 1, wherein the frame assembly comprises an upright post, a cross-member support and a releasable lock.

10. The container dumping module of claim 1, wherein the first support plate, the second support plate, and the third support plate comprises angled portions extending in one of a "XY" plane or "XZ" plane.

11. The container dumping module of claim 1, wherein the support bracket is positioned perpendicular or substantially right angles to the third support plate, a front rail and a back rail, wherein the support bracket comprises a pair of curved hook members.

12. A container dumping module comprises:
  a frame assembly;
  a conveyor bed with plurality of rollers supported on the frame assembly;
  a cradle assembly positioned on the frame assembly, wherein the cradle assembly comprises:
    a finger-like structure having a top portion and a bottom portion in orthogonal planes, provided at a lower end of the cradle assembly, wherein the bottom portion supports at least a portion of bottom face of a container in one of a home position, a work position, and a transit position during a rotational motion of the cradle assembly;
    a pair of lower and upper guide support plates to support the container in one of the home position, the transit position, and the work position; and
    one or more sensors to monitor the container at one of: the home position, the work position and the transit position, wherein in the work position, the cradle assembly is configured to be rotated 360-degrees relative to the home position; and
  a drive assembly mechanically coupled to the frame assembly and configured to drive the cradle assembly to one of: the home position, the transit position, and the work position, wherein the home position, the transit position, and the work position is determined based on a type of item handled by the cradle assembly of the container dumping module.

13. The container dumping module of claim 12, wherein the cradle assembly further comprises:
  stacked layers of conveyor beds attached to each other, wherein each layer of conveyor bed comprises a pair of lower and upper guide support plates to support the container on the rollers on the conveyor beds.

14. The container dumping module of claim 12, wherein in the home position, the container is within the cradle assembly and is ready for dumping process.

15. The container dumping module of claim 12, wherein in the work position, the container is within the cradle assembly and is completing the dumping process, wherein in the work position, the cradle assembly is configured to be rotated 360-degrees relative to the home position.

16. The container dumping module of claim 12, wherein in the transit position, the container is within the cradle assembly and undergoes a transition from the home position to the work position and vice-versa.

17. The container dumping module of claim 12, wherein the lower guide support plates and the upper guide support plates are coupled to each other by support rods fastened using suitable fasteners in both the support plates.

18. The container dumping module of claim 12, wherein the drive assembly comprises a drive motor with a pinion gear, axle, timing belt, ring gear and pillow blocks with bearings.

* * * * *